United States Patent [19]

Morita et al.

[11] Patent Number: 4,611,403

[45] Date of Patent: Sep. 16, 1986

[54] SURFACE TRACER

[75] Inventors: Hideo Morita; Kenji Abiko; Tetsuo Nakamura, all of Kanagawa, Japan

[73] Assignee: Mitutoyo Mfg. Co., Ltd., Tokyo, Japan

[21] Appl. No.: 765,953

[22] Filed: Aug. 14, 1985

[30] Foreign Application Priority Data

Aug. 18, 1984 [JP] Japan .................. 59-172143

[51] Int. Cl.⁴ .............................. G01B 3/22
[52] U.S. Cl. .................................. 33/169 R; 33/561
[58] Field of Search ............... 33/556, 558, 559, 561, 33/503, 169 R; 308/5 R

[56] References Cited

U.S. PATENT DOCUMENTS 3,855,901  12/1974  Girardi ........................... 308/5 R
3,869,799  3/1975   Never et al. ..................... 33/561
4,084,323  4/1978   McMurtry ....................... 33/561

Primary Examiner—Charles Frankfort
Assistant Examiner—Patrick R. Scanlon
Attorney, Agent, or Firm—Koda and Androlia

[57] ABSTRACT

A surface tracer having a probe to trace the surface profile of a work continuously and read out the shapes of the work to three-dimensional coordinate electrical signals. The probe is rigidly connected with an X-axis slider which is supported on a base through Y- and Z-axis sliders so as to be slidable perpendicular to each other such that the probe can be slided on the surface of the work. The Z-axis slider is suspended from the base by a suspending spring to support the other X- and Y-axis sliders. Between the base and the X-axis slider a return spring for providing returning force to the probe to its original position is adopted. Pressurized air is supplied to the sliding face of each of the sliders to form an air bearing thereon.

1 Claim, 3 Drawing Figures

SURFACE TRACER

BACKGROUND OF THE INVENTION

1. Field of the Invention

The present invention relates to a surface tracer which can positively and accurately follow and measure the surface of a work.

2. Prior Art

There is well-known a contact type surface measuring system for continuously following and measuring the surface profile of a work. Such a system comprises a surface profile measuring tracer mounted on a three-dimensional CNC measuring machine or the like, with the contact probe thereof being moved on the surface of the work. By detecting the three-dimensional coordinates of the moving probe, the profile of the work can be determined. This is very useful for measuring works having complicated shapes.

One of such tracers is disclosed, for example, in U.S. Pat. No. 3,869,799 which comprises a detection pin freely movable along three axial directions. By causing the pin to follow the surface of a work, the desired surface profile of the work can be traced. In surface tracers of such a type, the contact probe is always in contact with the work. By calculating the measured displacement of the probe and the movement of the tracer itself, the desired coordinates on the surface of the work can be obtained. Alternatively, the motion of the tracer itself may be controlled while keeping the displacement of the probe constant. Surface coordinates can be recorded from the coordinates of the moved tracer.

In any event, the probe is always in contact with the work under a predetermined pressure. Therefore, the probe must be positively held relative to a base such that the pressure on the probe will be maintained constant in all the directions. Such a stable pressure can be obtained only when frictional resistances on various different parts or hysteresis characteristics of spring and the like are highly reduced.

In the aforementioned prior art system, the contact pressure is assured by the use of a leaf spring parallel to each axial direction. These springs also serve to return the probe to its original or reference position. The prior art system has a disadvantage in that the measurement of the tracer is directionally deviated by Z-axis errors and others produced due to irregularity of positional precision on installation of the leaf springs, non-linear characteristics of the leaf springs and the deformation of the springs.

Although other proposals also have been made, each of them has a reduced followability relative to the surface of a work due to friction loss at the sliding parts and other causes. This provides a limitation to the velocity of the moved tracer on measuring of the work so that the surface profile of the work will not be measured very well.

SUMMARY OF THE INVENTION

It is therefore an object of the present invention to provide a surface tracer having an improved followability in which a contact probe can be contacted by the surface of a work under a constant pressure in all the directions and be positively and accurately returned to its original or reference position.

To accomplish the above object, the surface tracer according to the present invention comprises a base and X-, Y- and Z-axis sliders movable in the respective directions perpendicular to the base and suspended relative to the base by the use of the suspending springs.

In fact, the base serves as a bearing suspended from a base block by supporting legs. The Z-axis slider is supported on this bearing to be vertically movable. The Z-axis slider is in turn engaged by Y- and X-axis sliders by slide groove means formed between each adjacent sliders such that X- and Y-axis sliders will be movable perpendicular to each other. The lowermost X-axis slider is rigidly connected with a probe adapted to contact to work to be measured.

The original or reference positions of said X- and Y-axis sliders are determined by a rod-like return spring with the lower end thereof being connected with X-axis slider. The upper end of the return spring is vertically slidably supported on the base.

Thus, the original position of the probe will be determined by both the suspending and return springs.

The present invention is further characterized by air bearing means formed between the adjacent sliding faces by introducing air under pressure therebetween. Therefore, each of the sliders can floatingly be supported without friction loss and with superior return performance.

DETAILED DESCRIPTION OF THE INVENTION

Figure 1:
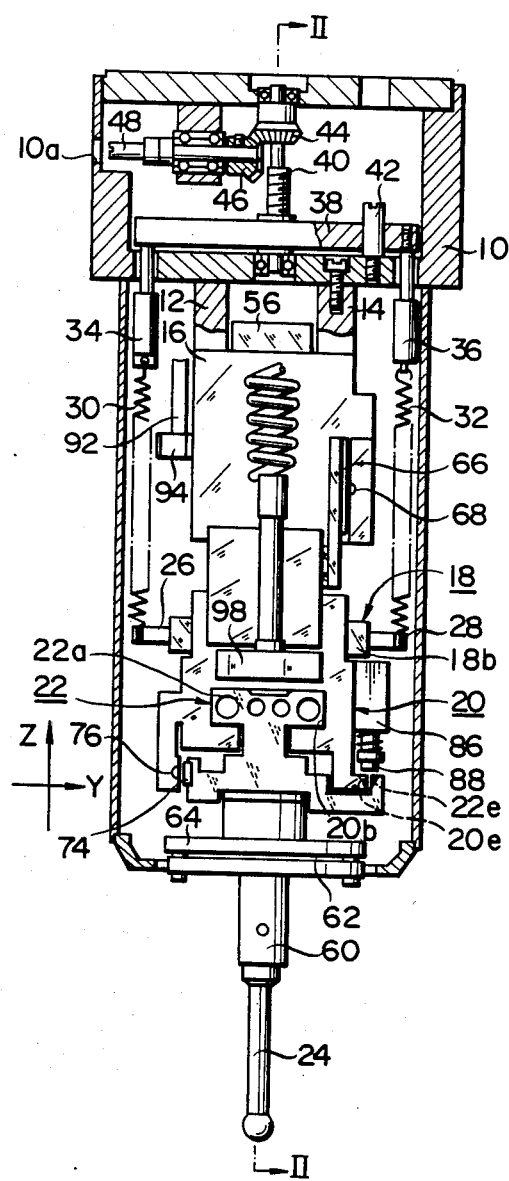
FIG. 1 is a longitudinal section of a preferred embodiment of a surface tracer constructed according to the present invention.

Referring now to the drawings, there is shown a surface tracer according to the present invention which comprises a base block 10 having its top face being fixable to the probe holder of a well-known three-dimensional CNC measuring machine (not shown). The tracer per se can manually or automatically be moved to any position of coordinates through the three-dimensional measuring machine.

A base 16 is rigidly mounted on the base block 10 through fixture legs 12 and 14 such that a probe 24 can be supported movably in any direction through the Z-axis slider 18, Y-axis slider 20 and X-axis slider 22.

Figure 3:
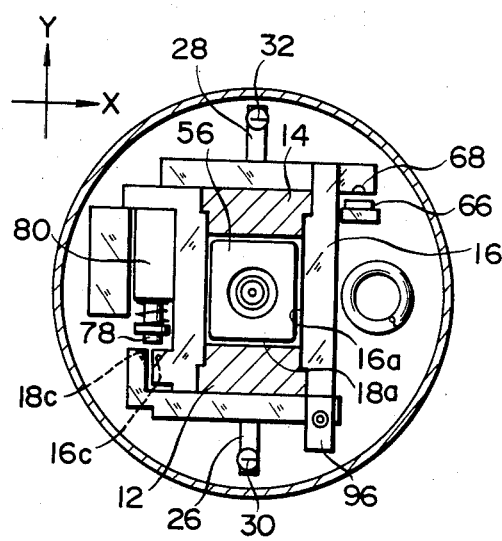
FIG. 3 is a cross-sectional view taken along a line III—III in FIG. 2.

As can be best seen from FIG. 3, the base 16 is in the form of a square-shaped sleeve having an inner periphery 16a in which the square column-shaped Z-axis slide shaft 18a of the Z-axis slider 18 is mounted slidably in the vertical (Z-axis) direction.

Figure 2:
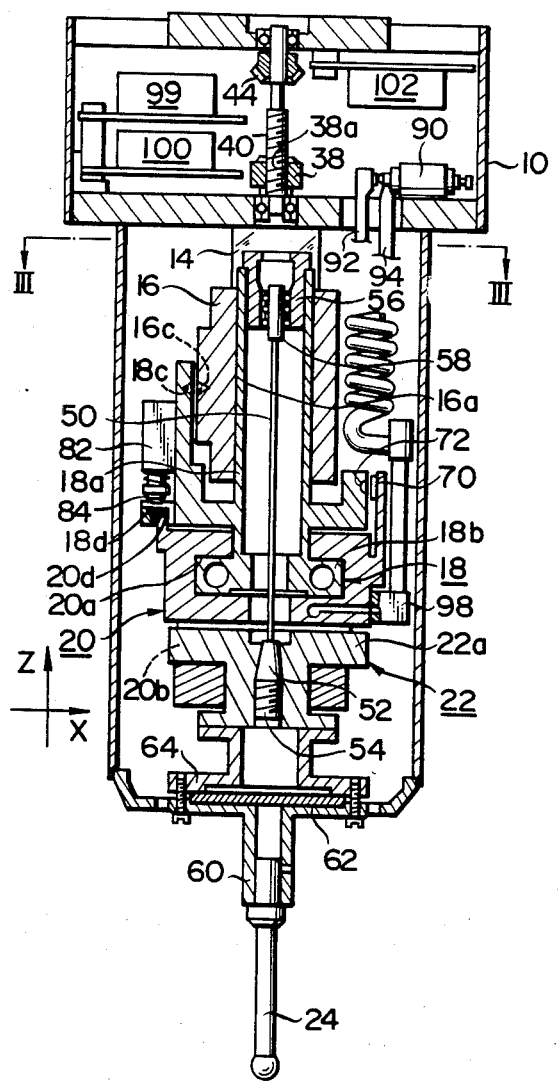
FIG. 2 is a cross-sectional view taken along a line II—II in FIG. 1.

As shown in FIG. 2, the Z-axis slider 18 has a guide shaft 18b engaged by the Y-axis slide groove 20a on the Y-axis slider 20. Thus, the Y-axis slider 20 can be freely slided relative to the Z-axis slider 18 in the Y-axis direction.

As shown in FIG. 1, the Y-axis slider 20 also includes a slide groove 20b which is slidably engaged by the X-axis slide shaft 22a on the X-axis slider 22. As a result, the X-axis slider 22 can freely be slided relative to the Y-axis slider 20 in the X-axis direction.

The sliders 18, 20 and 22 are suspended relative to the base. In FIG. 1, spring receiving lugs 26 and 28 extend outwardly from the opposite ends of the guide shaft 18b on the Z-axis slider 18. Each of these lugs 26 and 28 is engaged by a suspending spring 30 or 32 at the lower end thereof. The upper ends of the suspending spring 30 and 32 are rigidly connected with the base block 10. Thus, the slider assembly is such that its entire weight including the probe 24 will be supported at a position balanced with the tension of the suspending springs 30 and 32.

The upper end of each of the suspending springs 30 and 32 is rigidly connected with a spring position adjusting plate 38 through a spring support 34 or 36. By vertically moving this spring position adjusting plate 38, the group of sliders suspended by the suspending springs 30 and 32 can be adjusted with respect to position. More particularly, the spring position adjusting plate 38 includes a nut portion 38a threaded on a threaded shaft 40 which is journalled by the base block 10. When the threaded shaft 40 is rotated, the spring adjusting plate 38 can be vertically moved. It is noted that the spring adjusting plate 38 will not be rotated with the threaded shaft 40 since the former is held relative to the shaft 40 against rotation by means of a stopper pin 42.

In the illustrated embodiment, the threaded shaft 40 includes a bevel gear 44 rigidly mounted thereon, which bevel gear 44 engages another bevel gear 46 on a drive shaft 48 which can externally be rotated by any suitable means (not shown). The side wall of the base block 10 is provided with an access hole 10a through which any suitable means such as a screwdriver can be inserted into the base block 10 to rotate the drive shaft 48.

In this manner, the group of sliders is suspended by the suspending springs 30 and 32 to determine its original or reference position with respect to the vertical (or Z-axis) direction. In accordance with the present invention, furthermore, a return spring 50 is provided to determine another original or reference position in the X-, Y-axis plane. This return spring 50 is in the form of a wire having a circular cross-section, with the lower end thereof being rigidly connected with the X-axis slider 22 by a collet chuck 52. The collet chuck 52 can firmly grasp the return spring 50 by rotating a tightening screw 54 thereon.

The upper end of the return spring 50 is vertically and movably supported relative to the base 16. In the illustrated embodiment, the upper end of the return spring 50 is slidably supported in a bearing 56 rigidly connected with the Z-axis slide shaft 18a which is vertically slidable within the base 16, rather than supported directly by the base 16. In other words, the upper end of the return spring 50 is rigidly connected with a slide shaft 58 which is in turn supported slidably in the Z-axis direction within the bearing 56.

Thus, the upper end of the return spring 50 is fixed at its reference position in the X-, Y-axis plane. On the other hand, the other end of the return spring 50 provides a returning force in all the directions relative to the motion of the probe 24 in the X-, Y-axis plane since this other end of the return spring 50 is rigidly connected with the X-axis slider 22. In such a way, the original or reference position in the X-, Y-axis plane can be determined.

Since the slide shaft 58 is slidable within the bearing 56 in the Z-axis direction, the vertical displacement of the slide shaft 58 can be absorbed even if its position is changed by the motion of the slide shaft 58 in the X-, Y-axis plane.

In the illustrated embodiment, the characteristics of the return spring 50 can be changed by varying the location of the return spring 50 that is grasped in the collet chuck 52. Since the upper end of the return spring 50 is supported slidably in the Z-axis direction, the above variation can be made easily.

Thus, it is understood that a single original position for the group X-, Y-, Z-axis sliders can be determined and that the probe can be moved under an equalized pressure in all the X-, Y-, Z-axis directions.

In the illustrated embodiment, the probe 24 is detachably connected with a probe holder 60 which is in turn connected with the X-axis slider 22 through a vibrating element 62. The vibrating element 62 is rigidly mounted between the probe holder 60 and the vibrator holder 64. The vibrating element 62 is electrostrictive and is mechanically vibrated with very small amplitude. As a result, the probe 24 will contact the surface of the a work (not shown) while vibrating. Consequently, friction between the probe 24 and the surface of the work can be reduced to greatly improve the followability of the probe 24.

To measure the displacement of each of the sliders 18, 20 and 22 from the original or reference position, a scale is provided for each slider. The scale is used to detect the movement of each of the sliders by an optical sensor.

The Z-axis scale 66 extends upwardly from the Z-axis slider 18 and is positioned opposing the Z-axis sensor 68 on the base 16. The displacement of the probe 24 in the Z-axis direction can be determined from the relative movement of the Z-axis scale and sensors 66 and 68.

As shown in FIG. 2, the Y-axis scale 70 is located on the Y-axis slider 20 and positioned opposing Y-axis sensor 72 on the Z-axis slider 18. The Y-axis scale 70 cooperates with the Y-axis sensor 72 to determine the movement of the Y-axis slider 20 in the Y-axis direction.

As shown in FIG. 1, similarly, the X-axis scale 74 cooperates with the X-axis sensor 76 to detect the movement of the X-axis slider relative to the Y-axis slider 20.

In the illustrated embodiment, motion in any selected direction can be inhibited by pressing a solenoid-operated abutment pin against the corresponding part to be inhibited in motion.

The inhibition of the Z-axis motion is made between a groove 18c on the Z-axis slider 18 and a corresponding groove 16c on the base 16, as shown in FIGS. 2 and 3. A stopper pin 78 is provided for moving from a solenoid 80 into the grooves 16c and 18c. When the solenoid 80 is energized, the stopper pin 78 is moved into the grooves 18c and 16c to stop the motion of the Z-axis slider 18.

Similarly, the Y-axis slider 20 can be stopped by moving a stopper pin 84 from a solenoid 82 into grooves 20d and 18d which are formed on the Y-axis slider 20 and Z-axis slider 18, respectively.

Still similarly, the motion of the X-axis slider 22 can be stopped by moving a stopper pin 88 from a solenoid 86 into grooves 22e and 20e which are formed on the X-axis and Y-axis sliders 22 and 20, respectively.

In accordance with the present invention, pressurized air is supplied onto the slide faces 16a, 20a and 20b of the respective sliders 18, 20 and 22 to reduce friction between the contacting faces on each adjacent slider.

More particularly, the base block 10 includes a pressurized-air distributor 90 formed therein which is supplied with pressurized air from an external compressor (not shown), as in FIG. 2. Pressurized air is conducted to the respective sliding faces through ducts 92 and 94 to form air bearings thereon.

To supply the Z-axis direction sliding face 16a with the pressurized air, the duct 92 is connected with an air groove (not shown) on the base 16 through a conducting aperture 96 and then communicates with a plurality of small openings (not shown) on the sliding face 16a. Pressurized air is blown out through the small openings to form an air bearing by which Z-axis slide shaft 18a can be floated within the base 16.

On the other hand, pressurized air from the duct 94 is conducted from an introducing portion 98 onto the Y-axis slider 20 and then to a plurality of similar openings through Y-axis slider groove 20a, slide groove 20 and an additional air groove (not shown). Pressurized air blown out through these openings forms air bearings by which Y- and X-axis sliders 20 and 22 can be floated.

In this manner, the friction between each adjacent sliders can be highly reduced to improve the capacity of each of the sliders which it can return to its original position.

In the illustrated embodiment, the base block 10 includes pre-amplifiers 99, 100 and 102 for progressively amplifying electrical signals from the sensors 68, 72 and 76, whereby signals superior in electrical characteristics can be fetched.

As will be apparent from the foregoing, the present invention provides a surface tracer particularly useful for automatic measurement and other uses for the surface of a work, which has a stabilized contact pressure or motion in all the X-, Y- and Z-axis directions, can be very easily returned to the original or reference position and is improved in followability and precision.

We claim:

1. A surface tracer comprising a base, X-, Y- and Z-axis sliders supported on said base to be slidable perpendicular to each other, and a probe rigidly connected with said X-axis slider and adapted to contact the surface of a work, the profile of said surface being detected as electrical signals when said probe slides on the surface of said work, said tracer being characterized by suspending spring means for suspending all of said sliders from said base and return spring means for providing a returning force to return said X- and Y-axis sliders to their original positions with respect to said base, said return spring means having one end rigidly connected with said X-axis slider carrying said probe, the other end of said return spring means being supported slidably relative to said base in its longitudinal axis direction, and sliding faces between each of said sliders receive pressurized air to form an air bearing therebetween.

* * * * *